(12) United States Patent
Ikeda et al.

(10) Patent No.: US 6,932,386 B2
(45) Date of Patent: Aug. 23, 2005

(54) OCCUPANT RESTRAINT SYSTEM INCLUDING SIDE AIRBAG WITH VENT HOLE

(75) Inventors: Koji Ikeda, Saitama (JP); Fumitoshi Yasuhara, Saitama (JP); Fumiharu Ochiai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/465,024

(22) Filed: Jun. 19, 2003

(65) Prior Publication Data

US 2004/0056456 A1 Mar. 25, 2004

(30) Foreign Application Priority Data

Jul. 1, 2002 (JP) ........................................ 2002-191929
Jul. 1, 2002 (JP) ........................................ 2002-191930
Jul. 1, 2002 (JP) ........................................ 2002-191931

(51) Int. Cl.[7] ............................................. B60R 21/28
(52) U.S. Cl. .................... 280/739; 280/730.2; 280/749
(58) Field of Search ............................. 280/739, 730.2, 280/749

(56) References Cited

U.S. PATENT DOCUMENTS 5,536,038 A * 7/1996 Bollaert et al. .......... 280/730.2
6,170,860 B1 * 1/2001 Denz et al. .............. 280/730.2
6,361,071 B1 * 3/2002 Denz et al. ................. 280/739
6,447,006 B1 * 9/2002 Hess et al. .................. 280/739
6,457,741 B2 * 10/2002 Seki et al. ............... 280/730.2
6,520,522 B2 * 2/2003 Rothweiler et al. ...... 280/730.2

FOREIGN PATENT DOCUMENTS

JP          3-159836     *  7/1991  ................. 280/739
JP          11-235965       8/1999
JP          2000-033847     2/2000

* cited by examiner

*Primary Examiner*—Eric Culbreth
(74) *Attorney, Agent, or Firm*—Carrier, Blackman & Associates, P.C.; Joseph C. Carrier; William D. Blackman

(57) ABSTRACT

An occupant restraint system includes an airbag having at least one vent hole and an inflator. The airbag is inflated by a gas generated by the inflator when there is a vehicle collision, and deploys into a curtain shape along an inner side face of an occupant compartment. Since the vent holes, through which gas is discharged from an inflatable part of the airbag, are made to open downward at the lower edge of the airbag, not only is it possible to reliably prevent the inflatable part from being excessively inflated, and thereby from becoming hard resulting in a failure to gently restrain an occupant, but also it is possible to prevent the vent holes from being blocked by the vehicle body or an occupant, thus reliably exhibiting a gas discharge function and preventing the gas discharged though the vent holes from directly impinging on the occupant.

5 Claims, 16 Drawing Sheets

OCCUPANT RESTRAINT SYSTEM INCLUDING SIDE AIRBAG WITH VENT HOLE

BACKGROUND OF THE INVENTION

1. Field of the Invention

The present invention relates to an occupant restraint system in which an airbag is disposed in a folded state along an upper edge of a door opening of a vehicle body and the airbag is inflated by a gas generated by an inflator when the vehicle is involved in a side collision or a rollover so that it is deployed into a curtain shape along an inner side face of an occupant compartment.

2. Description of the Related Art

A conventional occupant restraint system is known in, for example, Japanese Patent Application Laid-open Nos. 2000-33847 and 11-235965. The airbag of this type of occupant restraint system includes an inflatable part that inflates when a gas is supplied thereto and is deployed along the inner side face of an occupant compartment to restrain an occupant.

The airbag of the conventional occupant restraint system does not include a vent hole, whereby the airbag inflates to become hard when a gas is supplied from an inflator, thus making it difficult to gently restrain the occupant. Further, there is a possibility that the occupant might suffer an increased peak acceleration and a rebound phenomenon, that is, a phenomenon in which the occupant rebounds from the airbag.

Although providing a vent hole in the airbag so as to release part of the gas therein is conceivable to prevent an excessively increased internal pressure within the airbag, since the vent hole makes it impossible to retain the gas within the airbag, there is a possibility that the airbag might excessively deflate due to a load restraining the occupant, thus shortening the time available for restraining the occupant with the airbag.

Furthermore, the airbag of the conventional occupant restraint system is deployed both in a vehicle side collision and a vehicle rollover to protect the head of the occupant, but since a strong impact is momentarily exerted when the vehicle is involved in the side collision, in order to suppress the peak acceleration exerted on the occupant, it is desirable that excess gas within the airbag is efficiently discharged through a vent hole, thus lowering the internal pressure of the airbag. On the other hand, when the vehicle rolls over, it is necessary for the airbag to be maintained in a deployed state for a comparatively long period of time, but if a vent hole is provided in the airbag, there is a possibility that the gas might leak through the vent hole and the airbag deflate too soon, resulting in an inadequate performance of restraining the occupant. If the vent hole is made small or eliminated in order to prevent the early deflation of the airbag, there is then a possibility that the internal pressure of the airbag might excessively increase when the vehicle is involved in a side collision.

SUMMARY OF THE INVENTION

The present invention has been achieved in view of the above-mentioned circumstances, and it is a first object of the present invention to gently restrain an occupant by means of an airbag that deploys into a curtain shape along an inner side face of an occupant compartment.

Furthermore, it is a second object of the present invention to prevent excessive deflation of an airbag and ensure a sufficient period of time for restraining an occupant, while reducing the peak acceleration exerted on the occupant by the airbag being deployed into a curtain shape along an inner side face of an occupant compartment and preventing a rebound phenomenon.

Moreover, it is a third object of the present invention to achieve an airbag occupant restraint performance both in a vehicle side collision and a vehicle rollover.

In order to accomplish the first object, a first aspect of the present invention proposes an occupant restraint system in which an airbag is disposed in a folded state along an upper edge of a door opening of a vehicle body and the airbag is inflated by a gas generated by an inflator when a vehicle is involved in a collision so that it is deployed into a curtain shape along an inner side face of an occupant compartment, wherein a vent hole is provided in an inflatable part of the airbag.

With this arrangement, the vent hole is provided in the inflatable part of the airbag that deploys into a curtain shape along the inner side face of the occupant compartment, so that the vent hole operates to prevent the airbag from excessively inflating to become hard, thereby gently restraining the occupant.

Furthermore, in order to accomplish the first object, in addition to the first aspect, a second aspect of the present invention proposes the occupant restraint system wherein the vent hole opens on an outer periphery of the airbag.

With this arrangement, the vent hole, through which the gas is discharged, opens on the outer periphery of the airbag, so that it is possible to prevent the vent hole from being blocked by the vehicle body or the occupant thus reliably exhibiting a gas discharge function, and it is also possible to prevent the gas discharged though the vent hole from directly impinging on the occupant.

Moreover, in order to accomplish the first object, a third aspect of the present invention proposes an occupant restraint system in which an airbag is disposed in a folded state along an upper edge of a door opening of a vehicle body and the airbag is inflated by a gas generated by an inflator when a vehicle is involved in a collision so that it is deployed into a curtain shape along an inner side face of an occupant compartment, wherein the airbag includes an inflatable part at a position corresponding to an occupant protection area, and a vent hole through which the gas is discharged from the inflatable part is made to open at a position away from the occupant protection area.

With this arrangement, the vent hole through which the gas is discharged from the inflatable part of the airbag that deploys into a curtain shape along the inner side face of the occupant compartment is made to open at a position away from the occupant protection area, so that not only does the vent hole operate to prevent the airbag from excessively inflating to become hard thereby gently restraining the occupant, but also the gas discharged though the vent hole is prevented from directly impinging on the occupant in the occupant protection area.

Furthermore, in order to accomplish the second object, a fourth aspect of the present invention proposes an occupant restraint system in which an airbag is disposed in a folded state along an upper edge of a door opening of a vehicle body and the airbag is inflated by a gas generated by an inflator when a vehicle is involved in a collision so that it is deployed into a curtain shape along an inner side face of an occupant compartment, wherein the airbag includes an inflatable part formed in an occupant protection area and a secondary chamber formed outside the occupant protection area, and the inflatable part communicates with the secondary chamber via a vent hole.

With this arrangement, the airbag that is deployed into a curtain shape along the inner side face of the occupant compartment includes the inflatable part formed in the occupant protection area and the secondary chamber formed outside the occupant protection area, and the inflatable part communicates with the secondary chamber via the vent hole. Therefore, when the internal pressure of the inflatable part increases due to the load by the inflated airbag restraining the occupant, part of the gas within the inflatable part flows into the secondary chamber via the vent hole, thus lowering the pressure of the inflatable part, reducing the peak acceleration exerted on the occupant, and preventing a rebound phenomenon. Moreover, since the gas passing through the vent hole does not dissipate to the outside but flows into the secondary chamber, the capacity of which is limited, it is possible to prevent the airbag from excessively deflating due to the occupant restraint load, thereby ensuring a sufficient period of time for restraining the occupant.

Still further, since the vent hole does not open outside the airbag, it is possible to prevent the vent hole from being blocked by the vehicle body or the occupant to exert no function, and it is possible to prevent the gas discharged through the vent hole from directly impinging on the occupant.

Moreover, in order to accomplish the third object, a fifth aspect of the present invention proposes an occupant restraint system in which an airbag is disposed in a folded state along an upper edge of a door opening of a vehicle body and the airbag is inflated by a gas generated by an inflator when a vehicle is involved in a side collision or a rollover so that it is deployed into a curtain shape along an inner side face of an occupant compartment, wherein the occupant restraint system includes a vent hole provided in the airbag, an open/close valve for opening and closing the vent hole, a side collision sensor for detecting a side collision of the vehicle, a rollover sensor for detecting a rollover of the vehicle, and a controller which opens the open/close valve when the side collision is detected and closes the open/close valve when the rollover is detected.

With this arrangement, if the side collision sensor detects a vehicle side collision, then the control means opens the open/close valve for opening and closing the vent hole. Therefore, when a strong impact is momentarily exerted at the time of the side collision, the gas is released through the vent hole to reduce the internal pressure of the airbag, thereby suppressing the peak acceleration exerted on the occupant. Furthermore, if the rollover sensor detects a vehicle rollover, then the control means closes the open/close valve for opening and closing the vent hole, so that the airbag can be maintained in a deployed state for a comparatively long period of time while the rollover continues, thereby reliably restraining the occupant.

The above-mentioned objects, other objects, characteristics and advantages of the present invention will become apparent from an explanation of current embodiments that will be described in detail below by reference to the attached drawings.

BRIEF DESCRIPTION OF THE DRAWINGS

FIG. 1 shows a state in which an airbag of an occupant restraint system is deployed within an occupant compartment of an automobile;

FIG. 2 is an enlarged view of the occupant restraint system in which the airbag has been deployed;

FIG. 3 is an enlarged view of a part of FIG. 2;

FIG. 4 is a cross sectional view along line 4—4 in FIG. 3; and

FIG. 5 is a cross sectional view along line 5—5 in FIG. 3.

FIG. 9 is an enlarged view of an occupant restraint system in which an airbag has been deployed;

FIG. 10 is an enlarged view of a part of FIG. 9;

FIG. 11 is a cross sectional view along line 11—11 in FIG. 10;

FIG. 12 is a cross sectional view along line 12—12 in FIG. 10; and

FIG. 13 is a graph showing changes in airbag internal pressure with time.

FIG. 15 is an enlarged view of an occupant restraint system in which an airbag has been deployed; and FIG. 16 is an enlarged view of a part of FIG. 15.

DESCRIPTION OF CURRENT EMBODIMENTS

The first embodiment of the present invention is explained below by reference to FIGS. 1 to 5.

Figure 1:
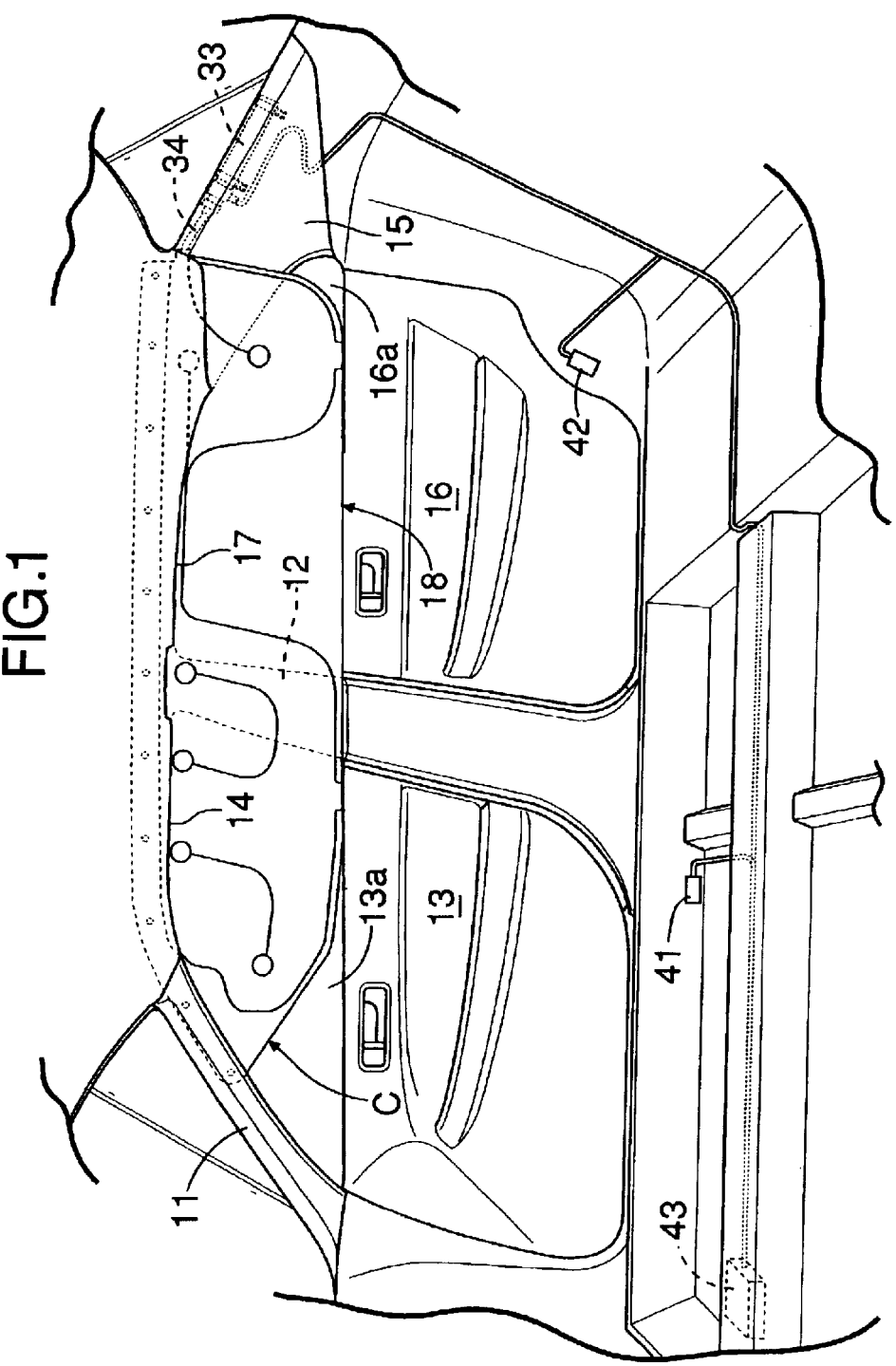
FIGS. 1 to 5 show a first embodiment of the present invention.
Figure 2:
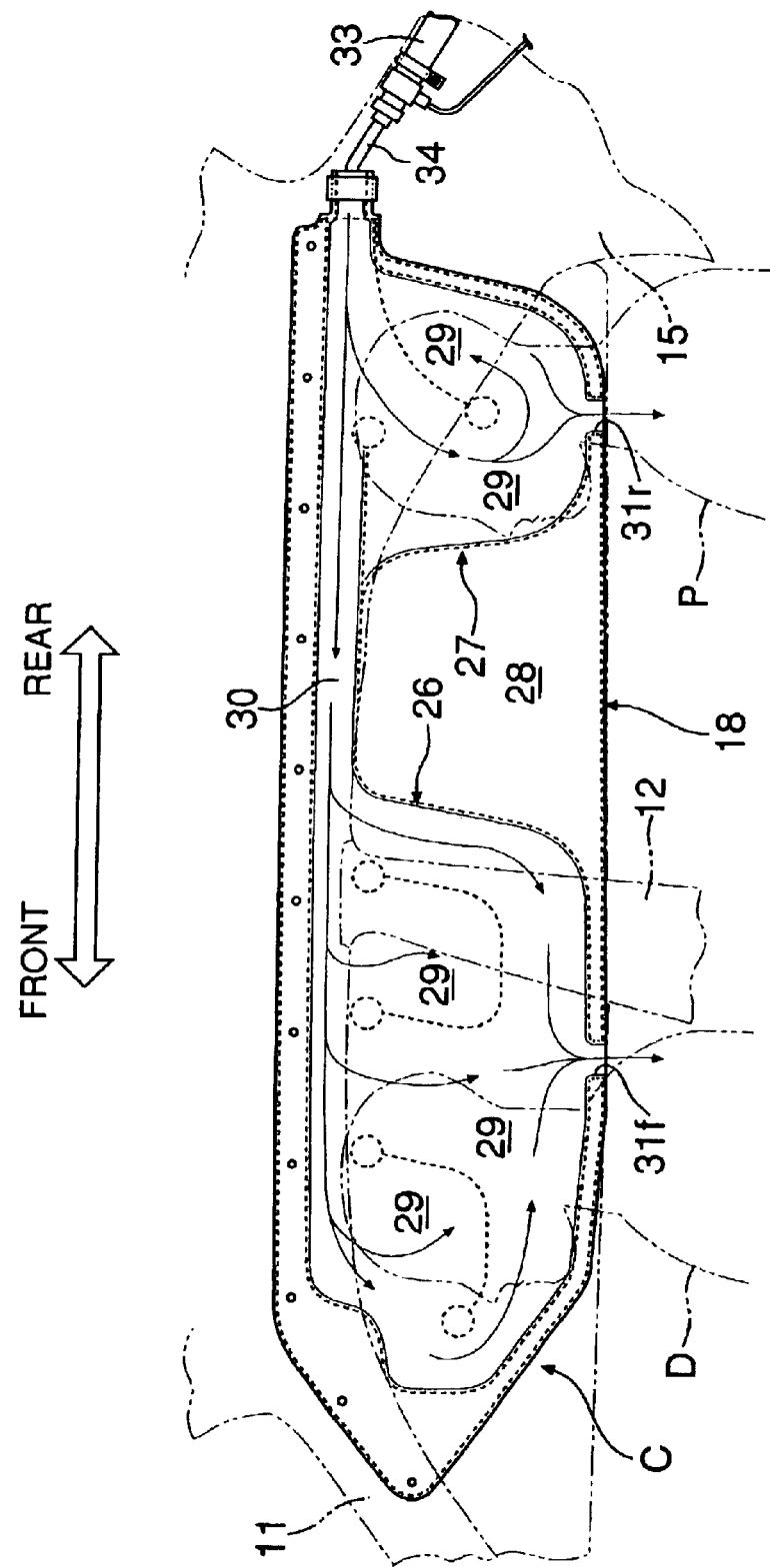
Figure 3:
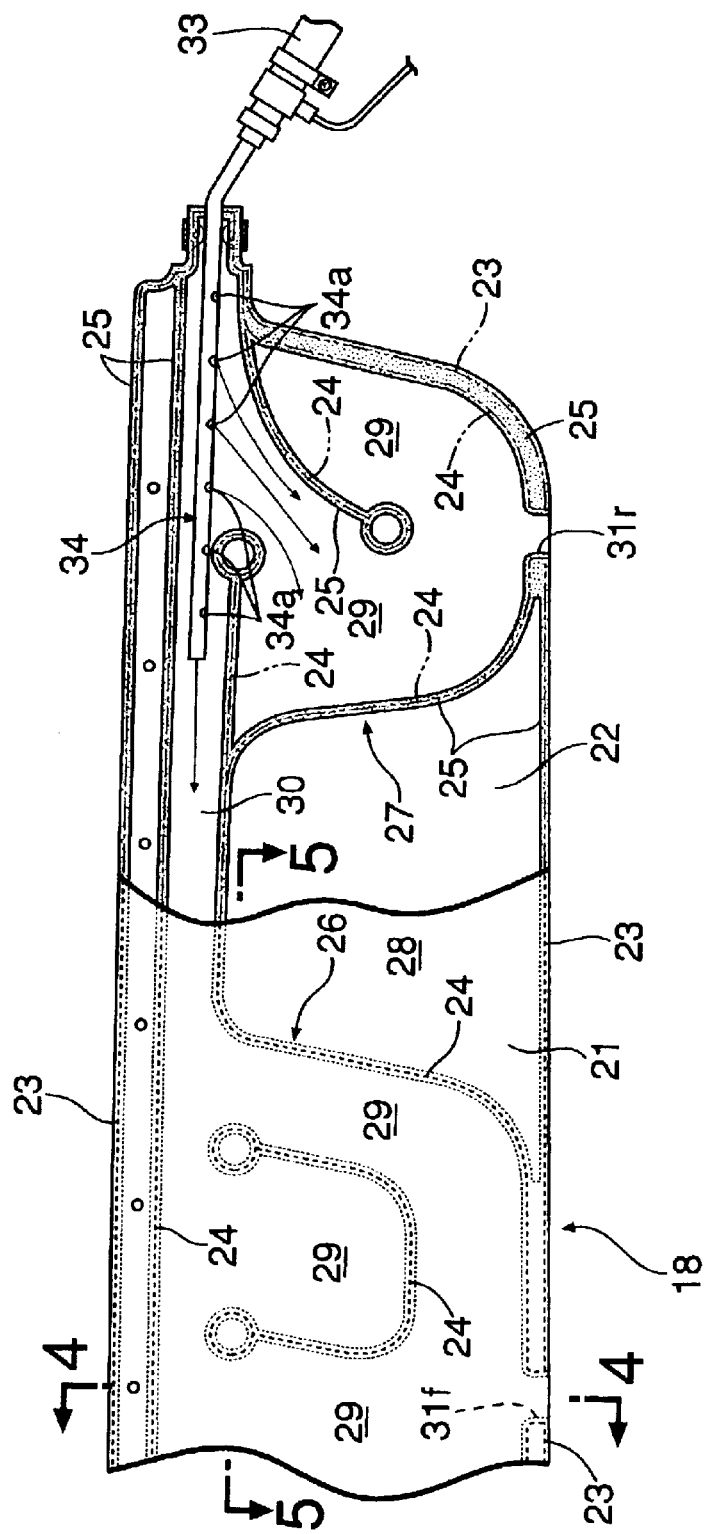
Figure 4:
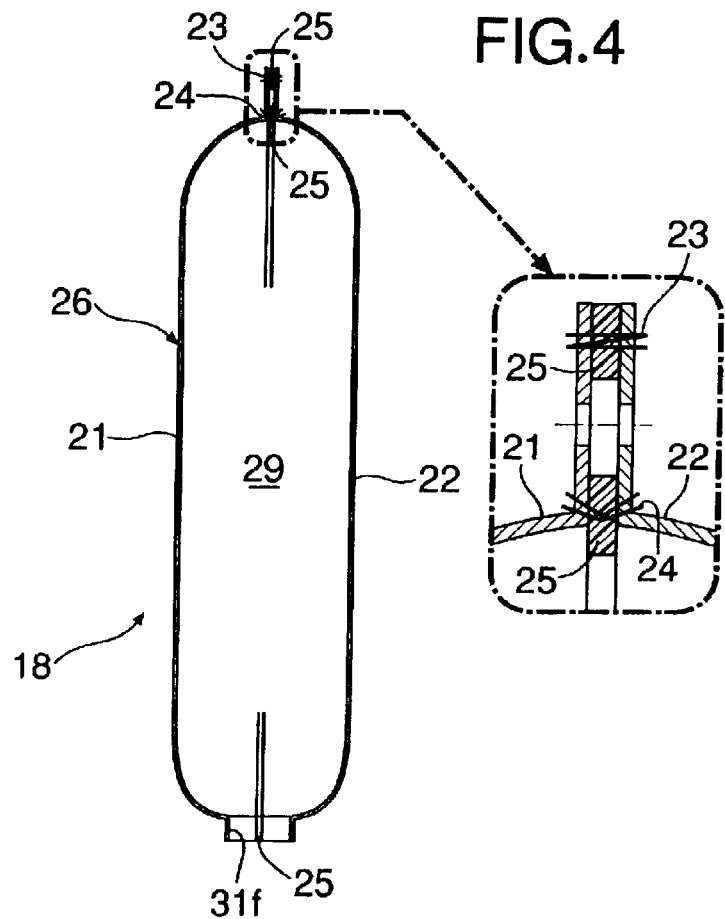
Figure 5:
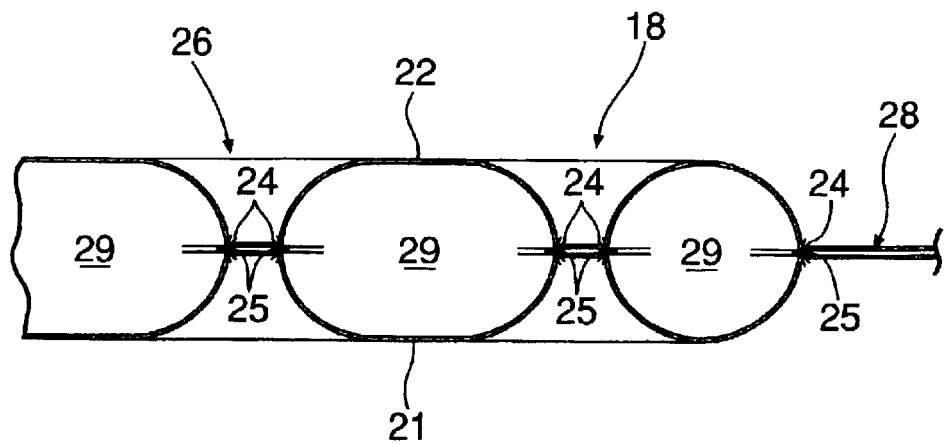

Referring to FIG. 1, formed between a front pillar 11 and a center pillar 12 on a vehicle body side face is a door opening 14 in which a front door 13 is mounted, and formed between the center pillar 12 and a rear pillar 15 is a door opening 17 in which a rear door 16 is mounted. A roof side rail (not illustrated) extends in the longitudinal direction of the vehicle body so as to provide a connection between the upper end of the front pillar 11 and the upper end of the rear pillar 15, the roof side rail defining the upper edges of the door openings 14 and 17 of the front door 13 and the rear door 16. An occupant restraint system C is provided along the roof side rail. The occupant restraint system C is provided on each of the left and right sides of the vehicle body, the two having substantially identical structures, and that provided on the right side of the vehicle body is representatively described below.

When the vehicle is involved in a side collision or a rollover, if an acceleration equal to or greater than a predetermined value is detected, an airbag 18 of the occupant restraint system C is deployed downward into a curtain shape from the upper edges of the door openings 14 and 17 so as to block occupants seated in front and rear seats from the inner side face of the vehicle body, that is, the front pillar 11, the center pillar 12, the rear pillar 15, a door glass 13a of the front door 13, and a door glass 16a of the rear door 16.

As shown in FIGS. 2 to 5, the airbag 18 extending in the longitudinal direction of the vehicle body is formed by sewing with stitching 23 outer peripheral parts of a first base fabric 21 and a second base fabric 22 superimposed one on top of the other and sewing with stitching 24 the inside thereof in a predetermined pattern, the two fabrics having substantially the same shape. Seals 25 for preventing gas leakage are interposed between parts of the first and second base fabrics 21 and 22 sewed by the stitching 23 and 24. The airbag 18 includes a front protection area 26 for protecting a head of an occupant D in the front seat, a rear protection area 27 for protecting a head of an occupant P in the rear seat, and a non-inflatable part 28 between the front protection area 26 and the rear protection area 27.

A plurality of inflatable parts 29 are formed in the front protection area 26 and the rear protection area 27 by the inside stitching 24 such that the inflatable parts 29 communicate with each other. The plurality of inflatable parts 29 also communicate with an upper communicating passage 30 extending longitudinally along the upper edge of the airbag 18. The seal 25 and the stitching 23 and 24 are discontinued in part in the lower edge of the front protection area 26, and a downward opening front vent hole 31f is formed therein. Similarly, the seal 25 and the stitching 23 and 24 are discontinued in part in the lower edge of the rear protection area 27, and a downward opening rear vent hole 31r is formed therein.

A front part of a gas supply pipe 34 extending forward from an inflator 33 housed within a rear pillar 15 is inserted into the upper communicating passage 30. Gas discharged from the tip end of the gas supply pipe 34 and openings 34a formed on the outer periphery in a middle section of the gas supply pipe 34 is distributed to each of the inflatable parts 29 via the upper communicating passage 30.

As shown in FIG. 1, a front side-collision sensor 41 and a rear side-collision sensor 42 are connected to an electronic control unit 43. When the electronic control unit 43 detects a vehicle side collision (or a vehicle rollover) based on signals from the two side-collision sensors 41 and 42, the electronic control unit 43 outputs an operation signal to the inflator 33 so as to deploy the airbag 18.

The operation of the first embodiment having the above-mentioned arrangement is now explained.

When a vehicle side collision or rollover is detected by the front side-collision sensor 41 or the rear side-collision sensor 42, the inflator 33 operates based on a command from the electronic control unit 43, and the gas from the inflator 33 flows into the inflatable parts 29 of the front protection area 26 and the rear protection area 27 via the gas supply pipe 34 and the upper communicating passage 30. As a result, the inflatable parts 29 of the airbag 18 stored along the roof side rail in a folded state inflate, the resulting pressure presses a roof garnish downward to form an opening, and the airbag 18 deploys downward within an occupant compartment through the opening so formed. The front protection area 26 of the deployed airbag 18 is present between an inner wall of the occupant compartment and the occupant D in the front seat, thereby protecting the head of the occupant D. The rear protection area 27 is present between the inner wall of the occupant compartment and the occupant P in the rear seat, thereby protecting the head of the occupant P.

After the airbag 18 is deployed in this way, excess gas within the inflatable parts 29 of the front protection area 26 is discharged through the front vent hole 31f, and excess gas within the inflatable parts 29 of the rear protection area 27 discharges through the rear vent hole 31r. Therefore, it is possible to reliably prevent the inflatable parts 29 from excessively inflating which would otherwise cause the parts to become hard resulting in a failure to gently restrain the occupant. In this process, since the front vent hole 31f and the rear vent hole 31r open downward at the lower edge of the airbag 18, the front vent hole 31f and the rear vent hole 31r are not blocked by and of the front door 13, the center pillar 15, the rear door 16, and the occupants D or P, thereby reliably exhibiting a function of discharging excess gas. If a vent hole is formed in the first and second base fabrics 21 and 22 of the airbag 18, it has been conventionally necessary to reinforce it by sewing an annular patch on the periphery thereof, but the present embodiment does not need the patch, thus contributing to a reduction in the number of components and the number of processing steps in manufacturing the airbag.

Figure 6:
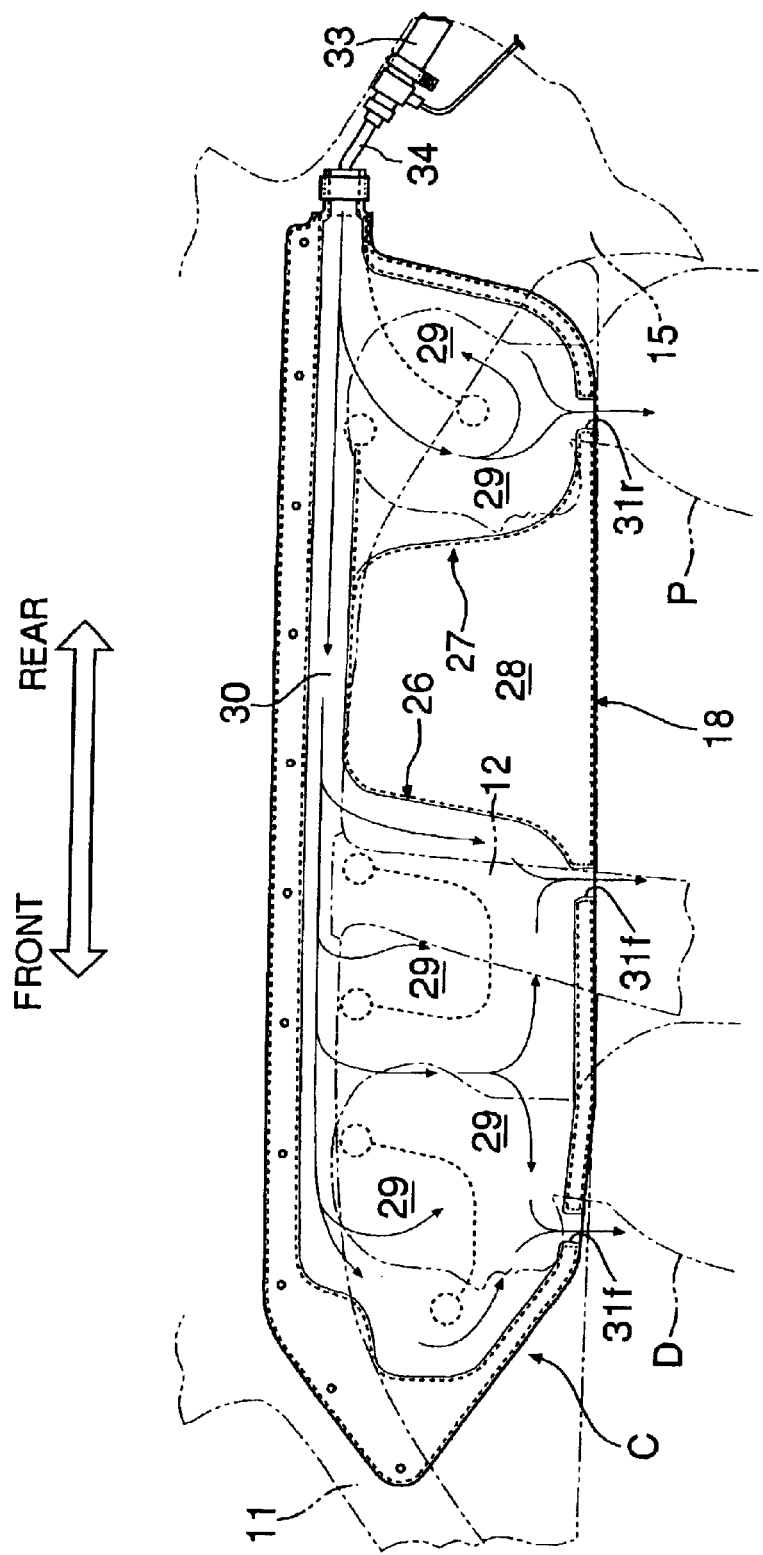
FIG. 6 is a view, corresponding to FIG. 2, of a second embodiment of the present invention.

The second embodiment of the present invention is now explained by reference to FIG. 6. In the embodiments below, including the second embodiment, the same reference numerals and symbols as those used in the first embodiment are used to denote parts corresponding to the parts of the first embodiment, thereby avoiding duplication of the explanation.

In the second embodiment, two vent holes 31f are formed in a front protection area 26, whose inflatable parts 29 have a capacity larger than that of the rear protection area 27. This enables excess gas to be more reliably discharged from the inflatable parts 29 of the front protection area 26.

Figure 7:
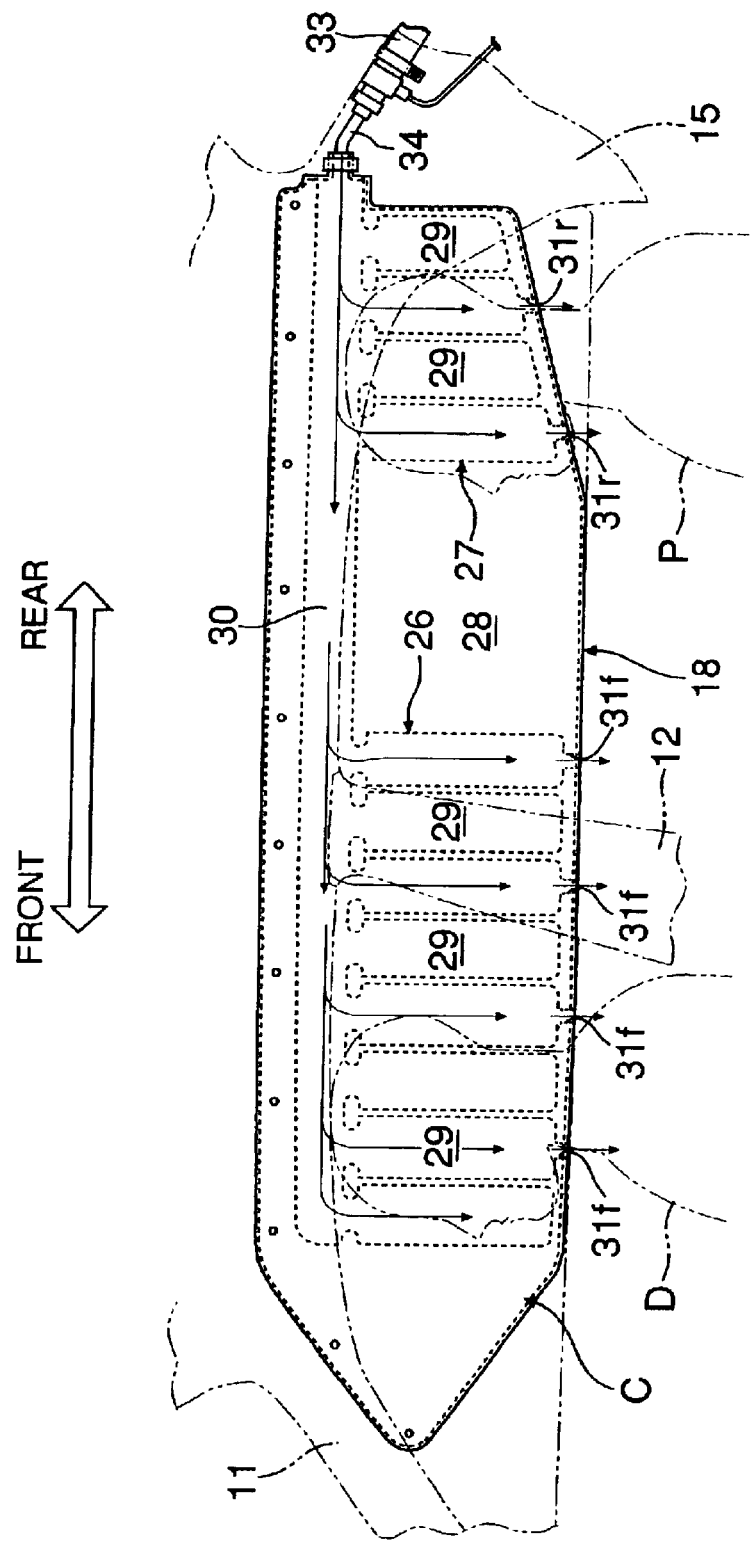
FIG. 7 is a view, corresponding to FIG. 2, of a third embodiment of the present invention.

The third embodiment of the present invention is now explained by reference to FIG. 7.

In the third embodiment, inflatable parts 29 of a front protection area 26 and a rear protection area 27 are formed in vertically extending tubular shapes, and four front vent holes 31f and two rear vent holes 31r are formed at the lower end of the inflatable parts 29 at predetermined intervals. This third embodiment can give the same operational effects as those of the second embodiment.

Figure 8:
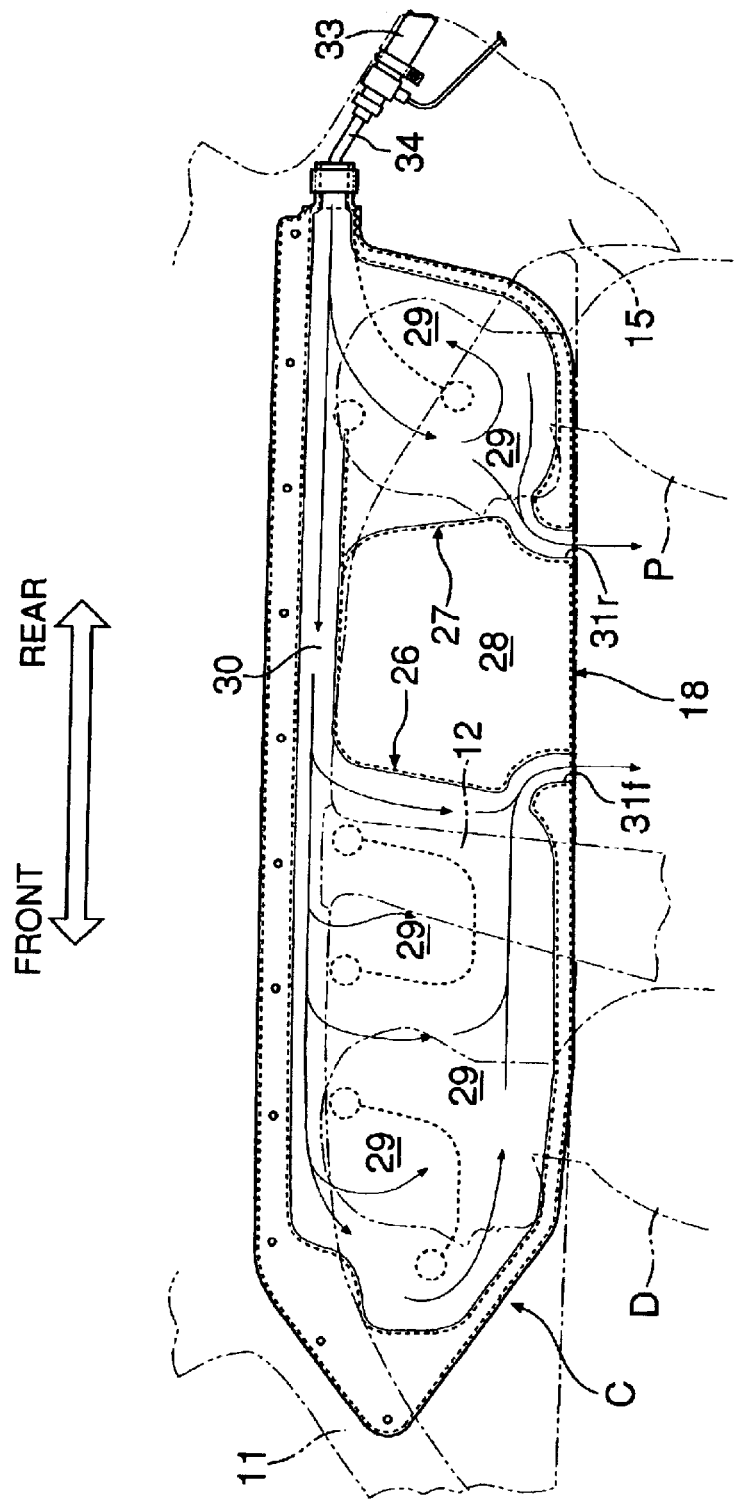
FIG. 8 is a view, corresponding to FIG. 2, of a fourth embodiment of the present invention.
Figure 9:
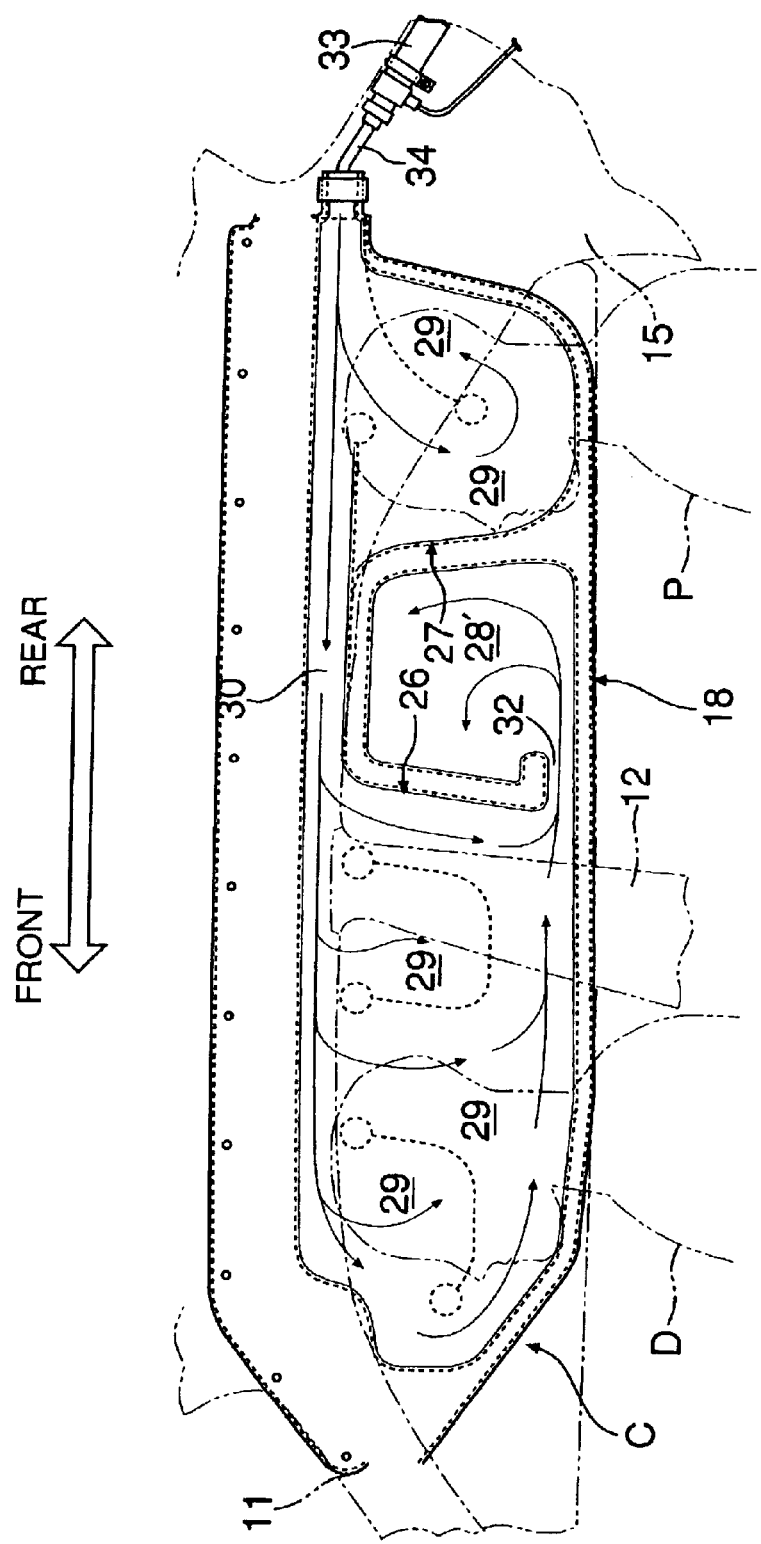
FIGS. 9 to 13 show a fifth embodiment of the present invention.
Figure 10:
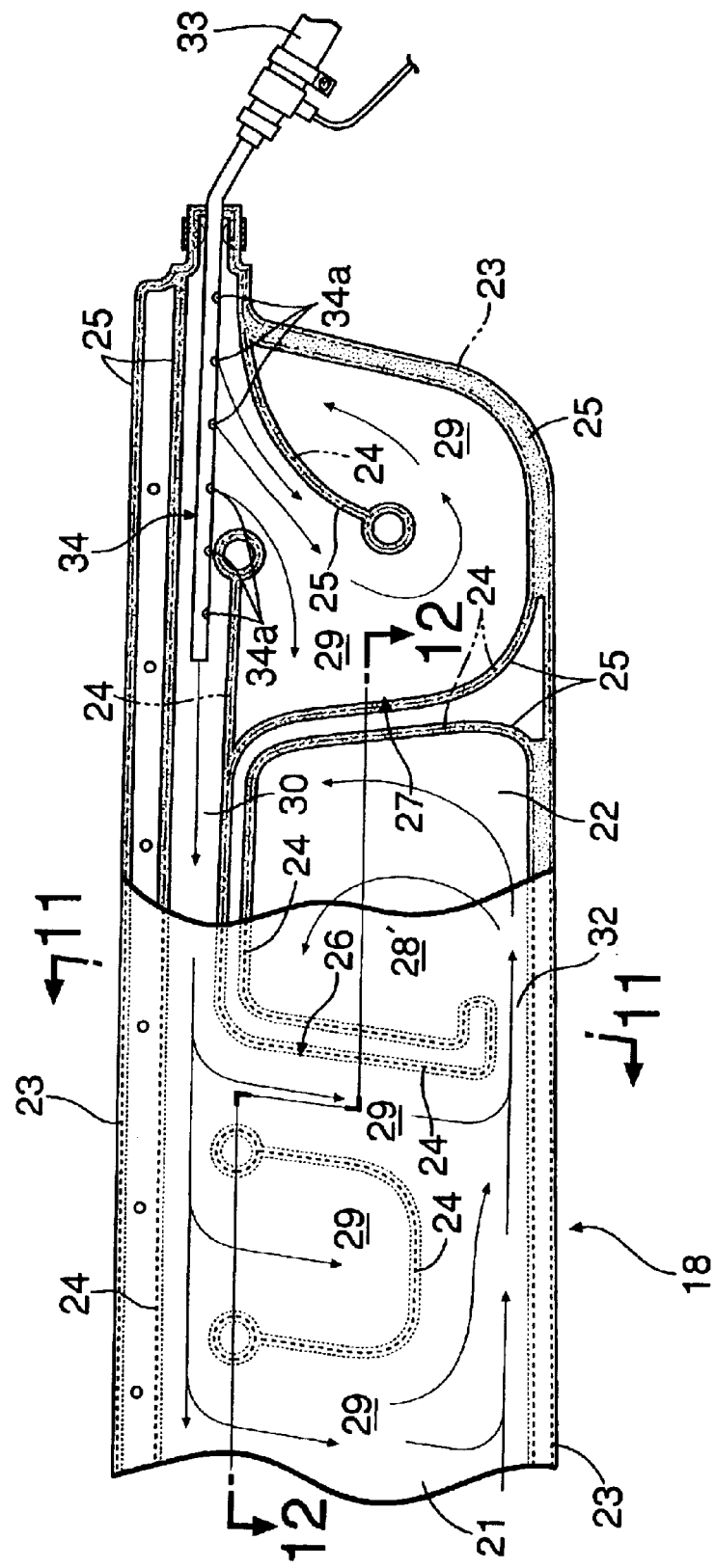
Figure 11:
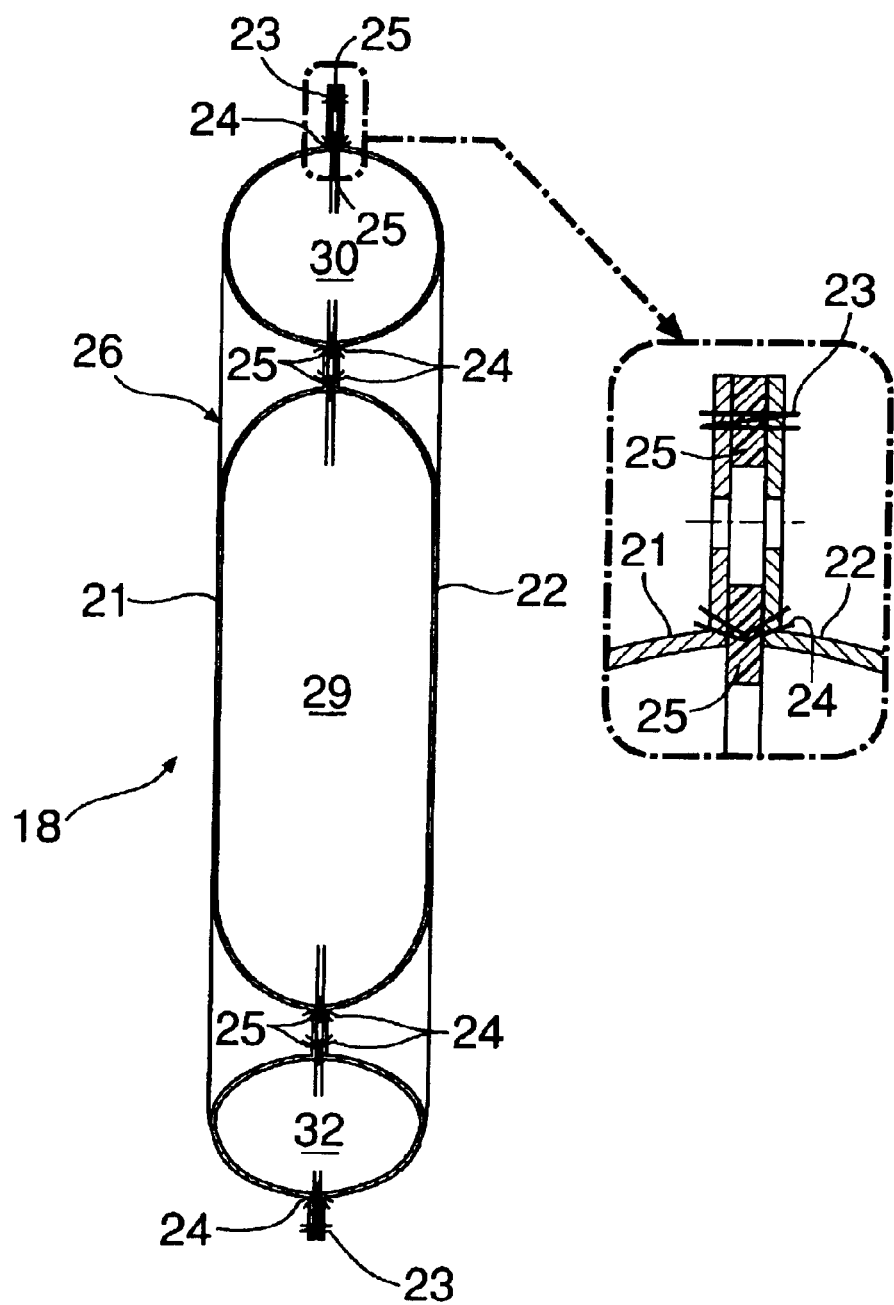
Figure 12:
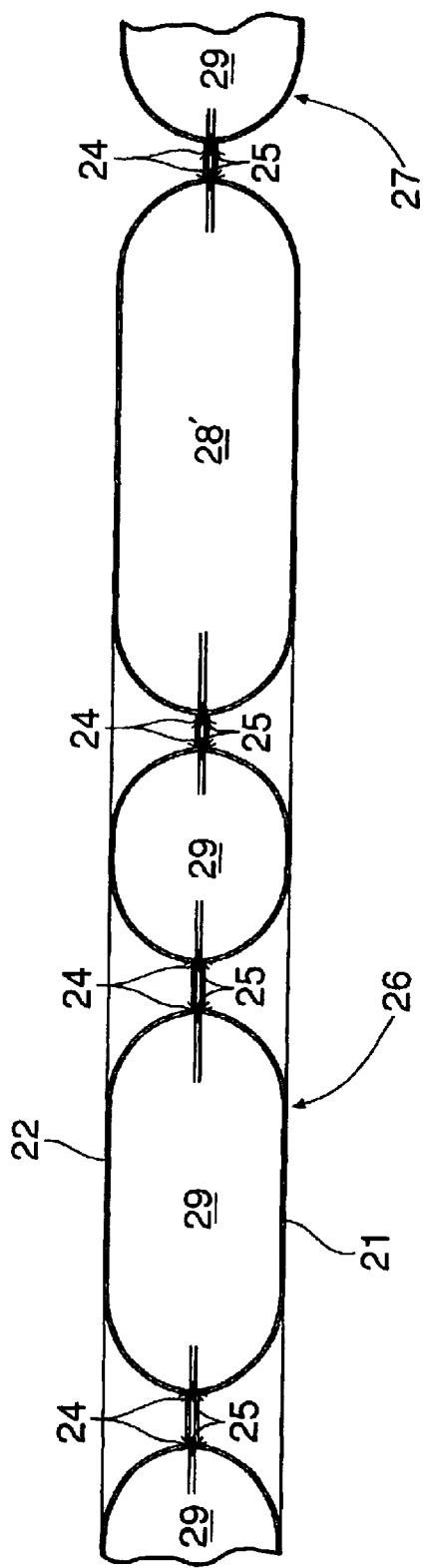

The fourth embodiment of the present invention is now explained by reference to FIG. 8.

In the fourth embodiment, a front vent hole 31f of a front protection area 26 is provided at a position adjacent to the front end of a non-inflatable part 28 of an airbag 18, and a rear vent hole 31r of a rear protection area 27 is provided at a position adjacent to the rear end of the non-inflatable part 28 of the airbag 18. Providing the front vent hole 31f and the rear vent hole 31r in this way at positions away from the front protection area 26 and the rear protection area 27 enables the gas discharged therefrom to be reliably prevented from directly impinging on occupants D and P. In addition, since the front vent hole 31f and the rear vent hole 31r of the fourth embodiment open downward at the lower edge of the airbag 18, the operational effects of the first embodiment can also be obtained.

The fifth embodiment of the present invention is now explained by reference to FIGS. 9 to 13.

As shown in FIGS. 9 to 12, an airbag 18 extending in the longitudinal direction of a vehicle body is formed by sewing with stitching 23 outer peripheral parts of a first base fabric 21 and a second base fabric 22 superimposed one on top of the other and sewing with stitching 24 the inside thereof in a predetermined pattern, the two fabrics having substantially the same shape. Seals 25 for preventing gas leakage are interposed between parts of the first and second base fabrics 21 and 22 sewed by the stitching 23 and 24. The airbag 18 includes a front protection area 26 for protecting a head of an occupant D in a front seat, a rear protection area 27 for protecting a head of an occupant P in a rear seat, and a secondary chamber 28' between the front protection area 26 and the rear protection area 27.

A plurality of inflatable parts 29 are formed in the front protection area 26 and the rear protection area 27 by the inside stitching 24 such that the inflatable parts 29 communicate with each other. The plurality of inflatable parts 29 also communicate with an upper communicating passage 30 extending longitudinally along the upper edge of the airbag 18. The lower rear end of the front protection area 26 communicates with the secondary chamber 28' via a vent hole 32.

A front part of a gas supply pipe 34 extending forward from an inflator 33 housed within a rear pillar 15 is inserted into the upper communicating passage 30. Gas discharged from the tip end of the gas supply pipe 34 and openings 34a formed on the outer periphery in a middle section of the gas supply pipe 34 is distributed to each of the inflatable parts 29 via the upper communicating passage 30.

The operation of the fifth embodiment having this arrangement is now explained.

When a vehicle side collision or a rollover is detected by a front side-collision sensor 41 or a rear side-collision sensor 42, the inflator 33 operates based on a command from an electronic control unit 43, and the gas stored under pressure within the inflator 33 flows into the inflatable parts 29 of the front protection area 26 and the rear protection area 27 via the gas supply pipe 34 and the upper communicating passage 30. As a result, the inflatable parts 29 of the airbag 18 stored along the roof side rail in a folded state inflate, the resulting pressure presses a roof garnish downward to form an opening, and the airbag 18 deploys downward within an occupant compartment through the opening so formed. The front protection area 26 of the deployed airbag 18 is present between an inner wall of the occupant compartment and the occupant D in the front seat, thereby protecting the head of the occupant D. The rear protection area 27 is present between the inner wall of the occupant compartment and the occupant P in the rear seat, thereby protecting the head of the occupant P.

When the internal pressure of the inflatable parts 29 increases due to the deployed airbag 18 restraining the heads of the occupants D and P, part of the gas within the inflatable parts 29 flows into the secondary chamber 28' via the vent hole 32, thus slightly decreasing the internal pressure of the inflatable parts 29. As a result, the peak acceleration exerted on the occupants D and P when being restrained by the airbag 18 can be reduced and a rebound phenomenon in which the occupants D and P rebound from the airbag 18 can be prevented. Furthermore, the gas passing through the vent hole 32 is collected in the secondary chamber 28' having a limited volume, without being released to the outside, thus preventing the airbag 18 from excessively deflating due to the occupant restraint load of the airbag 18, so that the airbag 18 is maintained in its deployed state to reliably restrain the occupants D and P.

Moreover, since the vent hole 32 opens in the closed secondary chamber 28' rather than to the outside the airbag 18, it is possible to prevent the vent hole 32 from being blocked by an inner face of the vehicle body or an occupant resulting in a failure to exhibit its gas discharge function, and to prevent the gas discharged through the vent hole 32 from directly impinging on the occupant.

Figure 13:
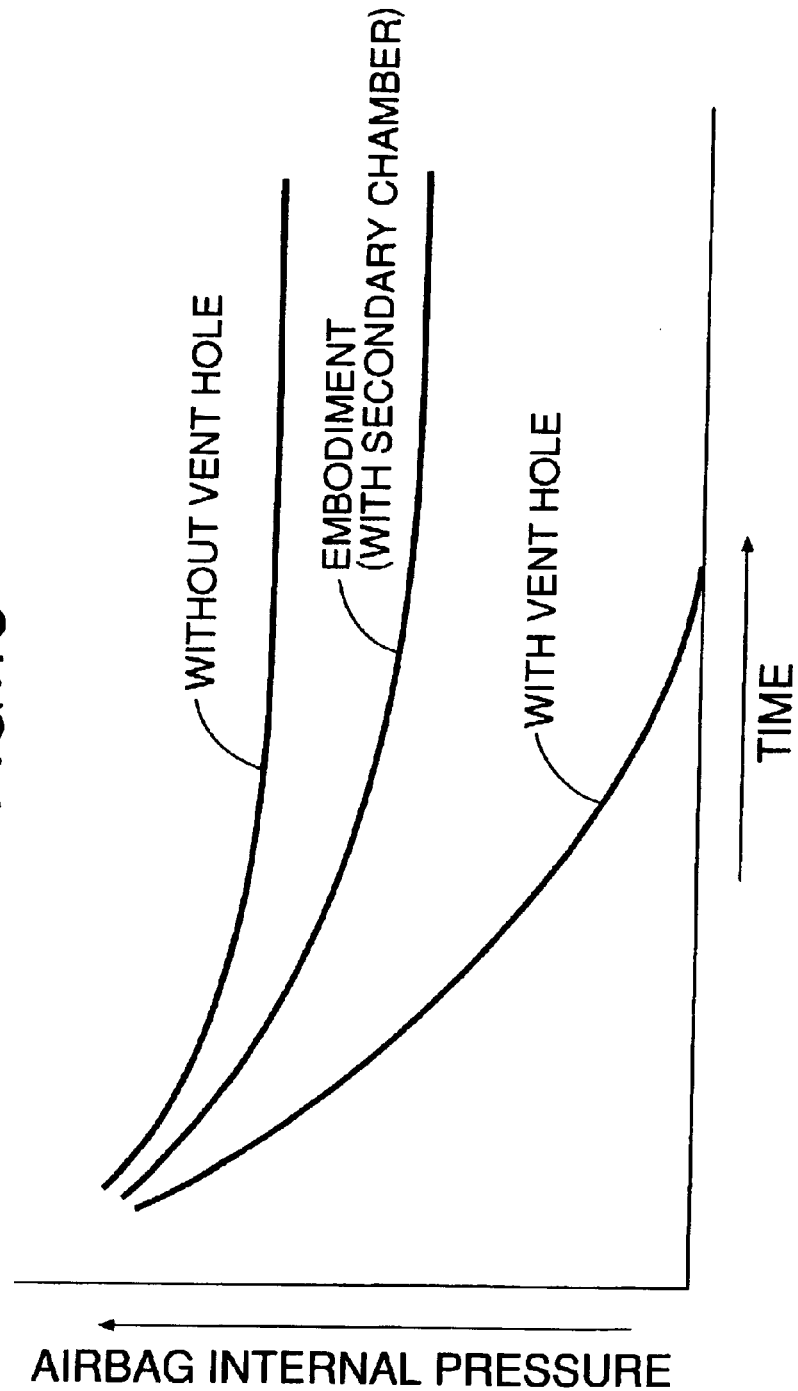

As is clear from FIG. 13, the internal pressure is maintained at an excessively high level in a conventional airbag having no vent hole, and the internal pressure rapidly decreases in a conventional airbag having a vent hole open to the outside, but the internal pressure of the airbag 18 of the present embodiment, which has the vent hole 32 open to the secondary chamber 28', can be maintained at an appropriate level.

Figure 14:
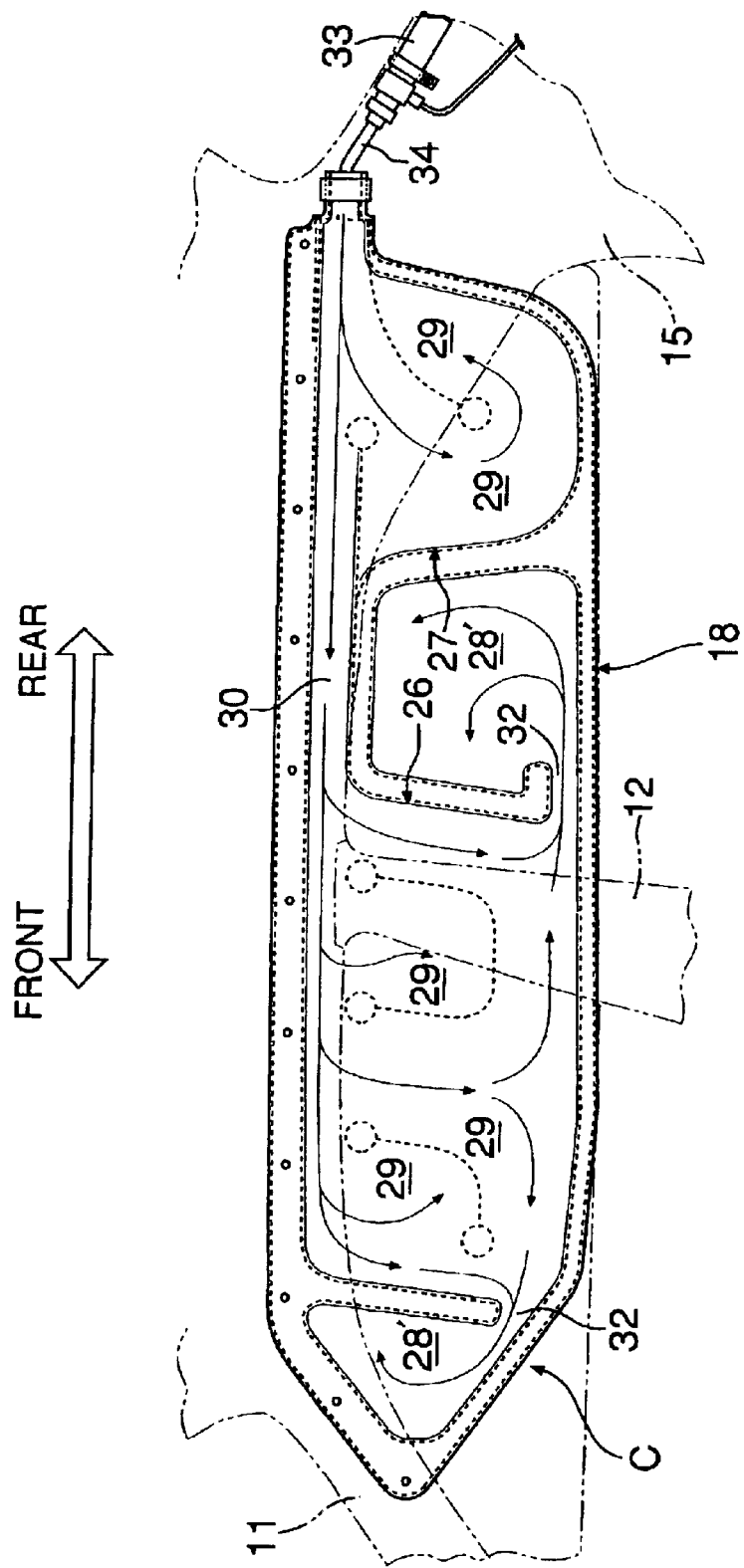
FIG. 14 is a view, corresponding to FIG. 9, of a sixth embodiment of the present invention.

The sixth embodiment of the present invention is now explained by reference to FIG. 14.

In the sixth embodiment, in addition to a secondary chamber 28' between a front protection area 26 and a rear protection area 27, there is also provided a secondary chamber 28' in front of the front protection area 26. Inflatable parts 29 of the front protection area 26 having a large capacity, communicate with the two secondary chambers 28' via two vent holes 32. In this sixth embodiment, the two secondary chambers 28' ensure a sufficient capacity.

Figure 15:
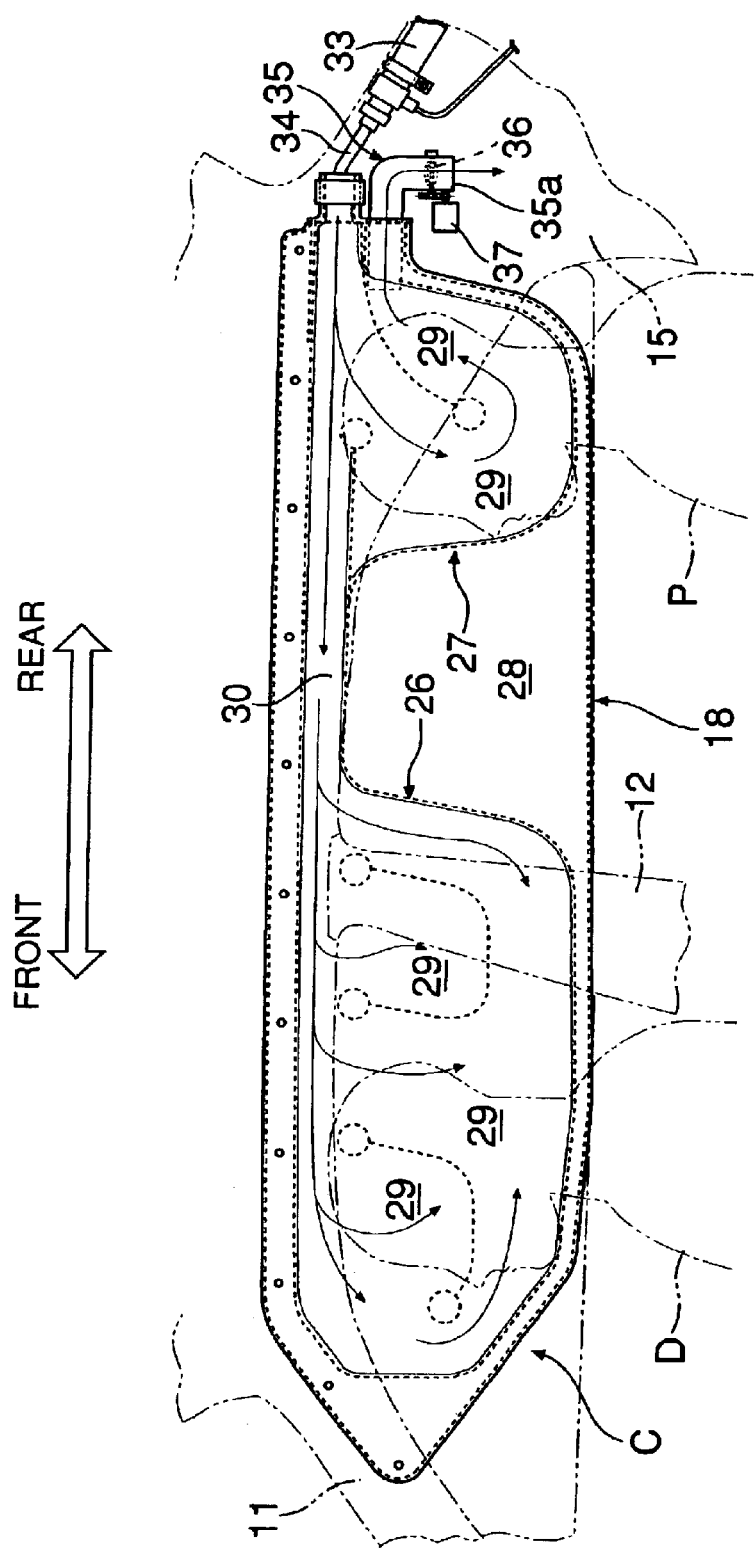
FIGS. 15 and 16 show a seventh embodiment of the present invention.
Figure 16:
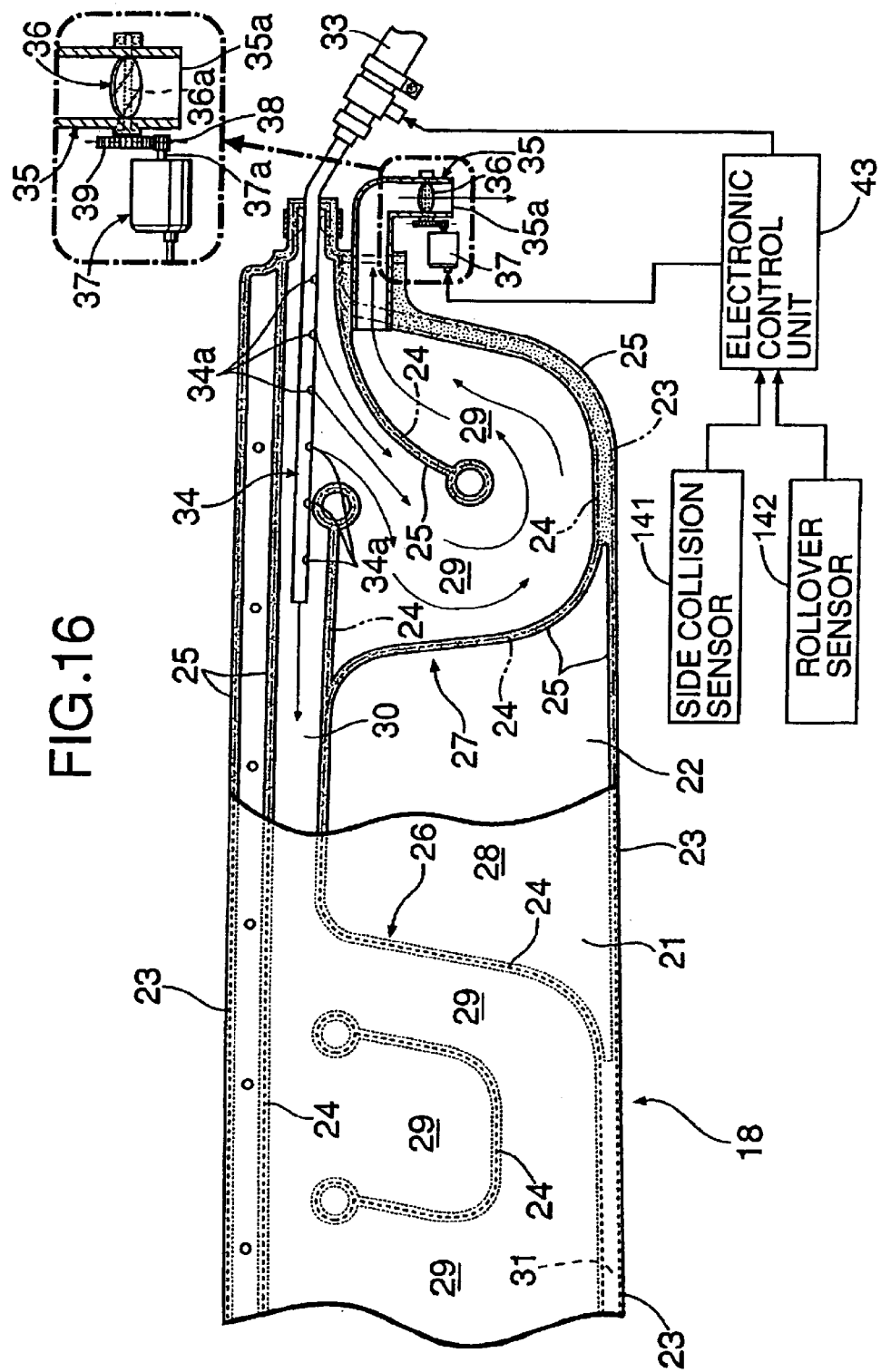

The seventh embodiment of the present invention is now explained by reference to FIGS. 15 and 16.

One end of an L-shaped pipe member 35 is connected to a vent hole in an inflatable part 29 at the rear end of a rear protection area 27. An open/close valve 36 for opening and closing a discharge opening 35a at the other end of the pipe member 35 is housed within the pipe member 35. A drive gear 38 provided on an output shaft 37a of a motor 37 meshes with a driven gear 39 provided on a valve shaft 36a of the open/close valve 36. Driving the motor 37 operates the open/close valve 36 via the drive gear 38 and the driven gear 39 to open and close the discharge opening 35a, thereby also effectively opening and closing the vent hole in the airbag.

A side collision sensor 141 for detecting a vehicle side collision and a rollover sensor 142 for detecting a vehicle rollover are connected to an electronic control unit 43. When the electronic control unit 43 detects a vehicle side collision or a vehicle rollover based on signals from the two sensors 141 and 142, operation of an inflator 33 and the motor 37 is controlled.

The operation of the seventh embodiment of the present invention having the above-mentioned arrangement is now explained.

When a vehicle side collision is detected by the side collision sensor 141 or a vehicle rollover is detected by the rollover sensor 142, the inflator 33 operates based on a command from the electronic control unit 43, and the gas from the inflator 33 flows into the inflatable parts 29 of a front protection area 26 and the rear protection area 27 via a gas supply pipe 34 and an upper communicating passage 30. As a result, the inflatable parts 29 of the airbag 18 stored along a roof side rail in a folded state inflate, the resulting pressure presses a roof garnish downward to form an opening, so that the airbag 18 deploys downward within an occupant compartment through the opening so formed. The front protection area 26 of the deployed airbag 18 is present between an inner wall of the occupant compartment and an occupant D in a front seat, thereby protecting a head of the occupant D. The rear protection area 27 is present between the inner wall of the occupant compartment and an occupant P in a rear seat, thereby protecting a head of the occupant P.

In a case in which the side collision sensor 141 detects a vehicle side collision, the open/close valve 36 is operated by the motor 37 to open the discharge opening 35a. It is therefore possible to release the gas through the discharge opening 35a via the open/close valve 36 when the load of the occupants D and P momentarily acts on the airbag 18 due to the strong impact of the side collision, thus decreasing the internal pressure of the airbag 18 and suppressing the peak acceleration exerted on the occupants D and P.

In a case in which the rollover sensor 142 detects a vehicle rollover, the open/close valve 36 is operated by the motor 37 to close the discharge opening 35a. It is therefore possible to suppress outflow of the gas within the deployed airbag 18 and maintain the airbag 18 in a deployed state, thereby reliably restraining the occupant for a comparatively long period of time during which the rollover continues.

In this way, opening the discharge opening 35a upon a vehicle side collision and closing the discharge opening 35a upon a vehicle rollover ensure an appropriate occupant restraint performance in either case.

Figure 17:
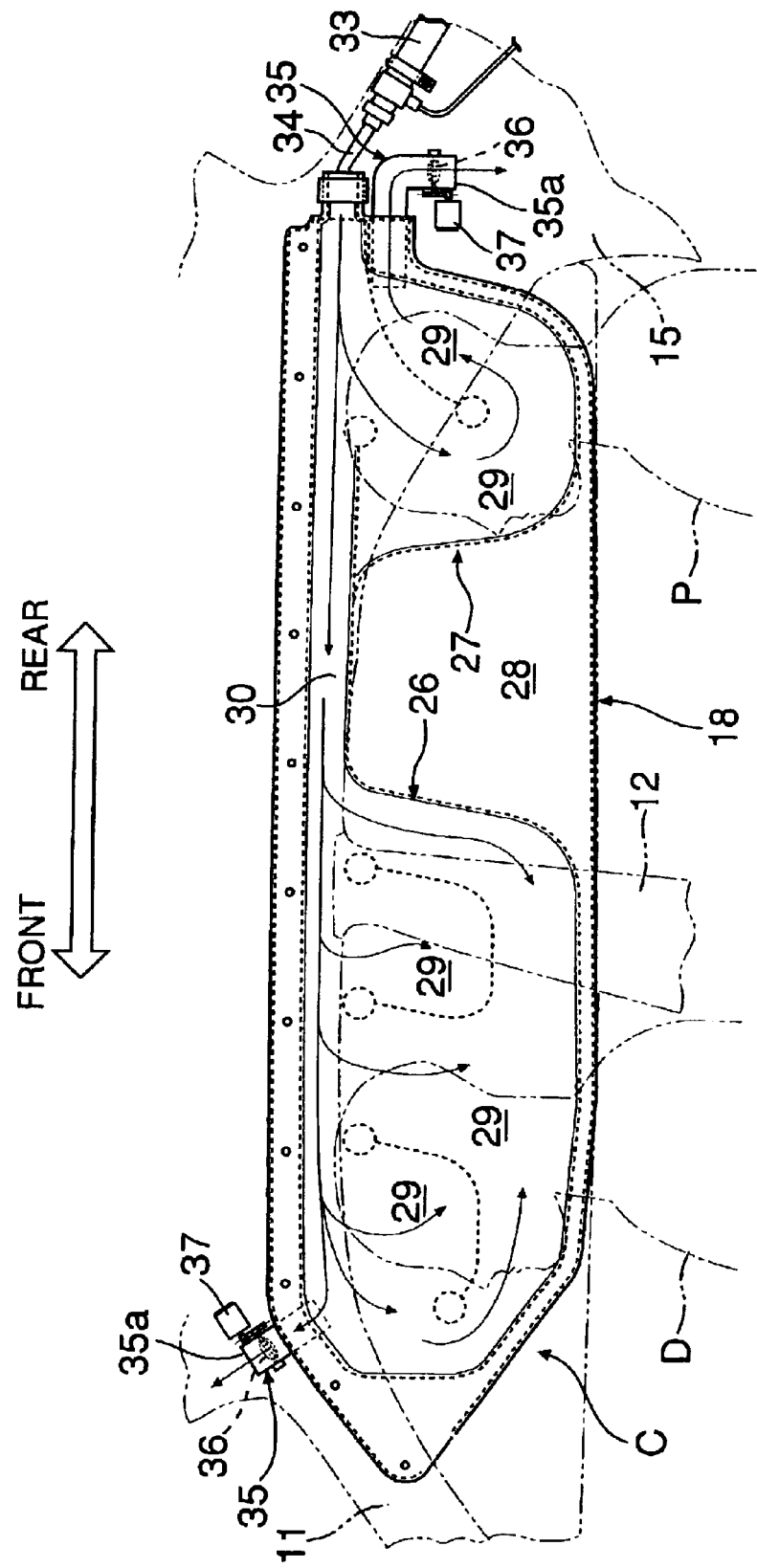
FIG. 17 is a view, corresponding to FIG. 15, of an eighth embodiment of the present invention.

The eighth embodiment of the present invention is now explained by reference to FIG. 17.

In the seventh embodiment, only the rear protection area 27 has the vent hole, the discharge opening 35a and the open/close valve 36, but in the eighth embodiment, both a rear protection area 27 and a front protection area 26 have a vent hole, a discharge opening 35a and an open/close valve 36. Two motors 37 connected to an electronic control unit 43 open two discharge openings 35a upon a vehicle side collision and close the two discharge openings 35a upon a vehicle rollover. In this eighth embodiment, the two vent holes and the two discharge openings 35a enable the internal pressure of inflatable parts 29 of the front protection area 26 and the rear protection area 27 to be more appropriately controlled.

Although embodiments of the present invention are explained in detail above, the present invention can be modified in a variety of ways without departing from the spirit and scope of the present invention.

For example, in the first to fourth embodiments, the vent holes 31f and 31r open downward at the lower edge of the airbag 18, but they can open at any position of the airbag 18 in any direction.

Furthermore, the structure of the open/close valve 36 is not limited to a butterfly valve illustrated in the seventh and eighth embodiments, and the actuator for driving the open/close valve 36 is not limited to the motor 37.

Moreover, in each embodiment, the airbag 18 is formed by sewing with stitching 23 and 24 first and second base fabrics 21 and 22, but it may be formed by bonding or Jacquard (seamless) weaving.

What is claimed is:

1. An occupant restraint system comprising:
    an airbag that is disposed in a folded state along an upper edge of a door opening of a vehicle body; and
    an inflator that generates a gas when a vehicle is involved in a collision, the gas inflating the airbag so that it is deployed into a curtain shape along an inner side face of an occupant compartment;
    wherein the airbag has a vent hole in an inflatable part thereof corresponding to an occupant protection area, said vent hole being open to an outside of the airbag to discharge the gas in said inflatable part directly to the outside, and
    wherein the airbag has a non-inflatable part outside said occupant protection area and the vent hole opens toward said non-inflatable part.

2. The occupant restraint system according to claim 1, wherein the vent hole opens on an outer periphery of the airbag.

3. The occupant restraint system according to claim 1, wherein the vent hole opens downwardly on an outer periphery of the airbag.

4. An occupant restraint system comprising:
    an airbag that is disposed in a folded state along an upper edge of a door opening of a vehicle body and having a vent hole in an inflatable part thereof,
    an inflator that generates a gas when a vehicle is involved in a collision, the gas inflating the airbag so that it is deployed into a curtain shape along an inner side face of an occupant compartment;
    an open and close valve for opening and closing the vent hole;
    a side collision sensor for detecting a vehicle side collision;
    a rollover sensor for detecting a vehicle rollover; and
    a controller which opens the open and close valve when the side collision is detected and closes the open and close valve when the rollover is detected.

5. An occupant restraint system comprising:
    an airbag that is disposed in a folded state along an upper edge of a door opening of a vehicle body; and
    an inflator that generates a gas when a vehicle is involved in a side collision or a rollover, the gas inflating the airbag so that it is deployed into a curtain shape along an inner side face of an occupant compartment;
    wherein the occupant restraint system comprises a vent hole provided in the airbag; an open and close valve for opening and closing the vent hole; a side collision sensor for detecting a vehicle side collision; a rollover sensor for detecting a vehicle rollover; and a controller which opens the open and close valve when the side collision is detected and closes the open and close valve when the rollover is detected.

* * * * *

UNITED STATES PATENT AND TRADEMARK OFFICE
CERTIFICATE OF CORRECTION

PATENT NO. : 6,932,386 B2
DATED : August 23, 2005
INVENTOR(S) : Koji Ikeda, Fumitoshi Yasuhara and Fumiharu Ochiai It is certified that error appears in the above-identified patent and that said Letters Patent is hereby corrected as shown below:

Column 6,
Line 2, change "excessively inflating when would otherwise cause" to
-- excessively inflating, when would otherwise cause --.

Column 8,
Line 59, change "the side collision sensor 141 detects" to -- the side collision sensor 41 detects --.

Column 9,
Line 1, change "the rollover sensor 142 detects" to -- the rollover sensor 42 detects --.

Signed and Sealed this

Fourteenth Day of February, 2006

JON W. DUDAS
*Director of the United States Patent and Trademark Office*